United States Patent [19]

Garnham et al.

[11] 4,208,709
[45] Jun. 17, 1980

[54] RECTIFIERS

[75] Inventors: Martin H. F. Garnham; Frank T. Bennell, both of London, England

[73] Assignee: Foster Transformers Limited, London, England

[21] Appl. No.: 921,732

[22] Filed: Jul. 3, 1978

[30] Foreign Application Priority Data

Jul. 25, 1977 [GB] United Kingdom ............... 31161/77

[51] Int. Cl.² .......................................... H02P 13/24
[52] U.S. Cl. ........................................ 363/90; 363/69; 323/48
[58] Field of Search ............................. 363/68, 69–70, 363/75, 82, 90–93; 323/48, 56, 89 R

[56] References Cited

U.S. PATENT DOCUMENTS

| | | | |
|---|---|---|---|
| 3,042,849 | 7/1962 | Dortort | 363/69 |
| 3,161,820 | 12/1964 | Chumakov | 363/69 X |
| 3,229,187 | 1/1966 | Jensen | 363/69 |
| 3,585,484 | 6/1971 | Dortort | 323/48 X |

Primary Examiner—J. D. Miller
Assistant Examiner—Peter S. Wong
Attorney, Agent, or Firm—Robert F. O'Connell

[57] ABSTRACT

A rectifier unit for 3-phase a.c. to d.c. conversion is of the type having a transformer with a star-connected and a delta-connected secondary the outputs of which are rectified and combined to give 12-pulse operation. To reduce the danger of current imbalance between the two secondaries, a compensating transformer unit is interposed between the secondaries and the rectifiers which modifies the signals such that any difference in the current drawn from one secondary compared with the other tends to equalize the current drawn from the secondaries. The compensating transformer unit can take the form of 3 individual transformer units but is preferably a single transformer with 3 limbs, each of which carries a main winding connected to one secondary and two opposed subsidiary windings which receive the phases from the other secondary which are closest to and on either side of the phase of the associated main winding.

10 Claims, 5 Drawing Figures

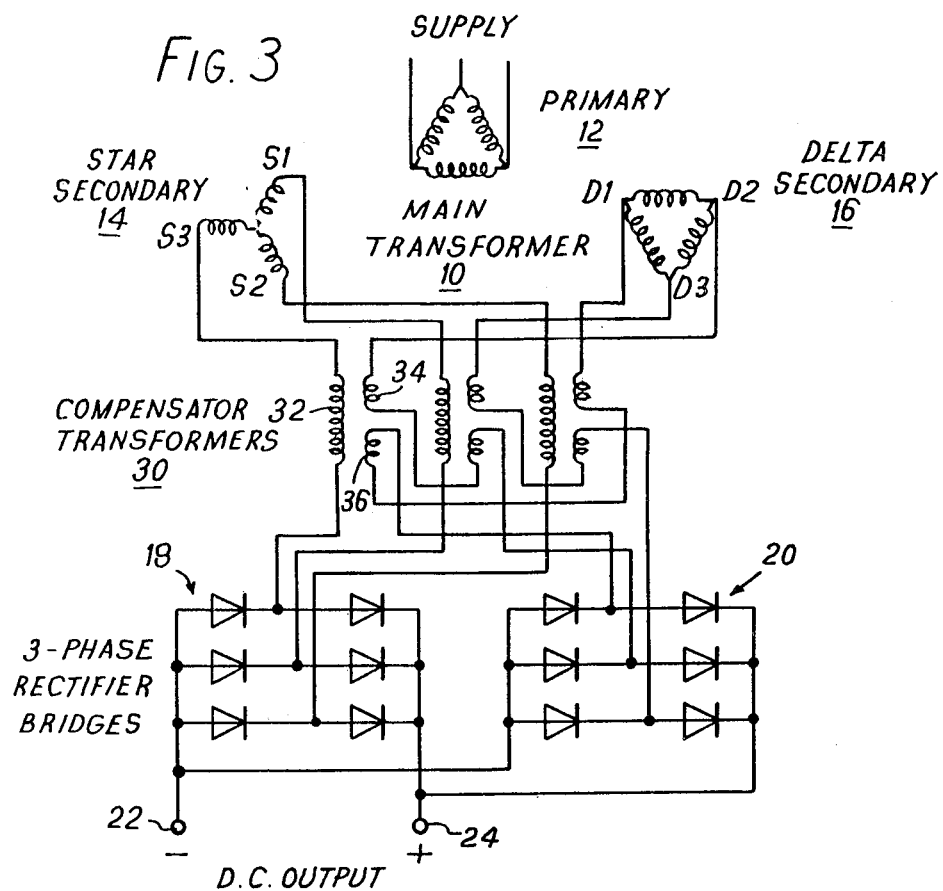
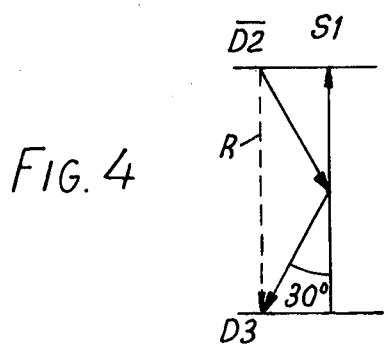

RECTIFIERS

BACKGROUND OF THE INVENTION

This invention concerns rectifier units for producing direct current from a multiphase a.c. source.

Circumstances arise where it is desired to obtain a relatively smooth d.c. output from a multiphase, usually 3-phase, a.c. supply. In such circumstances it is known to use what is called 12-pulse rectifier operation, and this can be achieved by the use of single-way phase-displaced transformer winding groups, or by using two phase-displaced 3-phase rectifier bridge circuits connected either in parallel or in series.

This invention is applicable to rectifier units with two phase-displaced multiphase rectifier bridge circuits connected in parallel. Such units may for example be used as sub-station rectifiers for railway traction.

A simple 3-phase bridge rectifier, if connected to a 3-phase a.c. source, will supply an output consisting, in each cycle of the alternating current, of the sum of six unidirectional sinusoidal pulses each a third of a cycle long and all being phase displaced by intervals of sixty degrees. This may be termed 6-pulse operation.

If two such bridge rectifiers are arranged to be supplied from two 3-phase a.c. sources which differ in phase by 30 degrees, or an odd integral multiple thereof, the two unidirectional outputs of the bridge rectifiers will each be of six-pulse type, but the pulses from one rectifier will lie intermediate the pulses from the other. Thus, if the two outputs are combined, twelve-pulse operation will result, with a consequent reduction in the amount of ripple on the final output.

With such a rectifier unit it is not easy to achieve equal current sharing between the two bridges. With this in mind several factors have to be looked after carefully, all tending to add to the cost, otherwise there could be a current imbalance as bad as three to one. The balance may in any event be upset by supply voltage harmonics.

SUMMARY OF THE INVENTION

According to this invention there is provided a rectifier unit for producing unidirectional current from an n-phase a.c. supply, where n is equal to 3 or an integer greater than 3, the unit comprising means for providing from the supply two n-phase sources which differ in phase by 1/4n cycles, or an integral multiple thereof, two n-phase bridge rectifiers having their inputs connected to receive the signals from the two sources and their outputs coupled together to provide the output of the unit, and compensating means coupled between the sources and the rectifiers for modifying the signals applied to the latter such that any difference in the current drawn from one source, compared with the current with the same phase drawn from the other source, produces a compensating magnetic flux tending to equalise the current drawn from the two sources.

The means for providing two n-phase sources may comprise a transformer with two differently-connected secondary windings. Thus for n equals 3, one secondary winding can be in star configuration and the other in delta configuration. The compensating means preferably takes the form of a compensating transformer with n (normally 3) limbs each having three windings, or alternatively n individual transformer units. A main winding of each compensating transformer limb can be connected to a respective phase of one of the sources. The subsidiary windings of each compensating transformer limb receive the phases from the other source which (whether positive or negative) are closest to and on either side of the phase of the associated main winding.

BRIEF DESCRIPTION OF THE DRAWINGS

The invention will now be described in more detail, by way of example, with reference being made to the drawings.

In the drawings:

FIG. 3 is a circuit diagram showing a rectifier unit embodying this invention;

FIG. 4 is a phase diagram illustrating how part of the circuit of FIG. 3 operates;

DETAILED DESCRIPTION OF THE PREFERRED EMBODIMENT OF THE INVENTION

Figure 1:
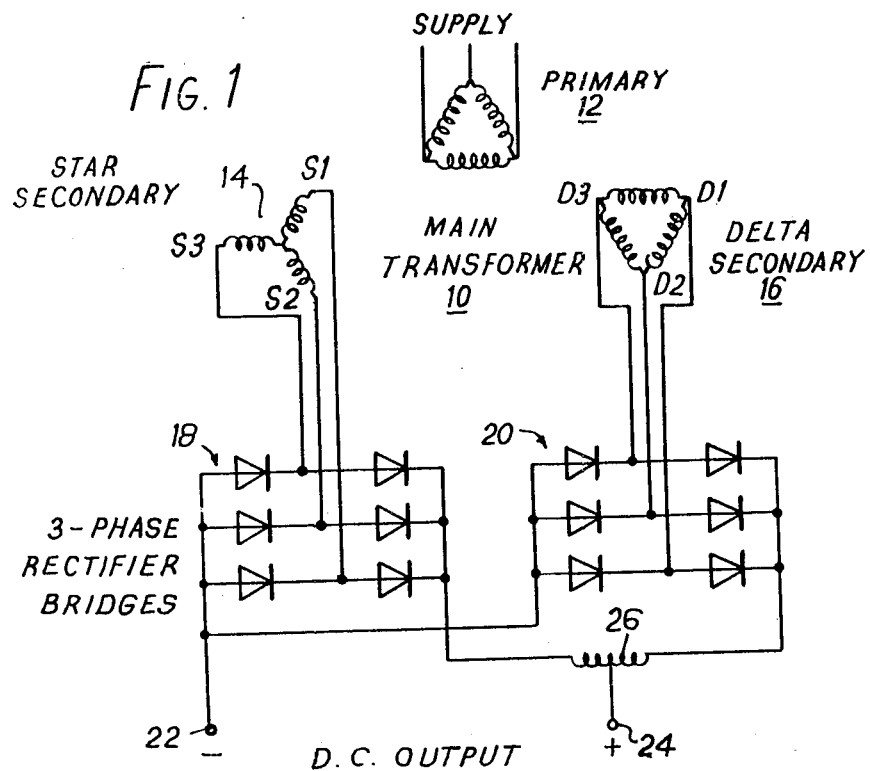
FIG. 1 is a circuit diagram of a known rectifier unit.

An example of one known rectifier unit is shown in FIG. 1 and will first be described. Two a.c. sources are constituted respectively by a star-connected secondary 14 and a delta-connected secondary 16 of a main transformer 10, the primary winding 12 of which may be delta-connected, as shown, or star-connected. Each secondary is connected to a respective 3-phase silicon rectifier bridge 18, 20. The negative outputs of the two bridges are connected together to provide the negative output terminal 22 of the unit, and the positive outputs of the two bridges are coupled to the positive output terminal 24 of the unit. The positive outputs of the two bridges cannot just be connected together, but rather are connected to opposed ends of an interphase transformer 26 the midpoint of which is connected to the positive output terminal 24.

Figure 2:
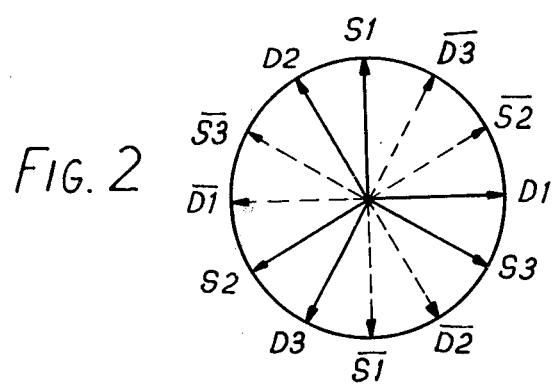
FIG. 2 is a diagram illustrating the different phases which arise in the transformer secondaries of the unit of FIG. 1.

FIG. 2 shows the different phases arising in the transformer secondaries. Assuming an output D1 of the delta secondary 16 defines the zero phase, the other outputs D2 and D3 of the delta secondary 16 will be at 120° and 240°. The outputs S1, S2 and S3 of the star-connected secondary 14 may be taken to have phases of 90°, 210° and 330°. The rectifiers 18 and 20 will serve to invert these phases, so that all the twelve phases shown in FIG. 2 will be comprised in the resultant output.

Figure 5:
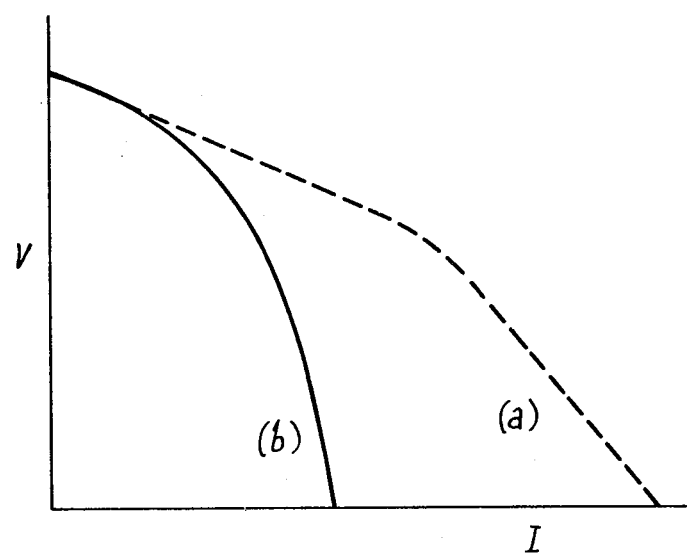
FIG. 5 is a graph showing the output voltage/current characteristic for the unit of FIG. 1

With a circuit of the type shown it is possible to obtain good d.c. voltage regulation and at the same time a reasonably low short-circuit current as shown in FIG. 5. To achieve this result it is necessary to have the transformer secondary windings 14 and 16 closely coupled. In FIG. 5 (a) is the output voltage versus output current characteristic without close coupling, and (b) with close coupling.

However, with a unit of the type shown in FIG. 1 it is not easy to achieve equal current sharing between the two transformers and respective bridges. As noted above, a current imbalance for example, three to one can arise. The circuit of FIG. 3 has been designed with a view to reducing this problem.

Much of the circuit of the rectifier unit embodying the invention and shown in FIG. 3 is identical to that of FIG. 1, and is accordingly not described again in detail. Similar parts in the two figures have the same reference.

In FIG. 3, however, the interphase transformer 26 is omitted and the positive outputs of the two bridge rectifiers 18, 20 are connected together to output terminal 24. The interphase transformer is replaced by a compensator transformer 30 having three limbs, the connections of which are as follows.

Each limb of the compensator transformer 30 has three windings, a main winding 32 and two partial windings 34 and 36. The two partial windings 34, 36 are equal in size and connected in opposite senses. The partial windings are of a size and sense such that when equal currents are drawn through all three windings they produce in the main winding a nut voltage equal to and opposite that across the main winding itself. This means that each partial winding has $1/\sqrt{3}$, i.e. $3^{-\frac{1}{2}}$, times as many turns as the main winding.

The main winding 32 of each limb of the compensator transformer 30 is connected to a respective one of the outputs of one of the main transformer secondary windings. As shown, the main winding 32 of each limb of the compensator transformer is connected to a respective terminal S1, S2 or S3 of the star-connected secondary 14. The two partial windings 34, 36 which are coupled with this winding 32 are connected to respective ones of the terminals D1, D2 and D3 of the delta-connected secondary 16; each of these terminals D1, D2 and D3 being connected to the bridge rectifier 20 through two series-connected partial windings on different compensator transformer limbs, one of these partial windings being an upper winding 34 and the other being a lower winding 36 connected in the opposite sense.

Reference is made to FIG. 4 illustrating the operation of the central compensator transformer limb 30. The main winding 32 is connected to the terminal S1 of secondary 14, the partial winding 34 is connected to the terminal D3 of secondary 16, and the partial winding 36 is connected in the opposite sense via the partial winding 34 of the left hand limb of the compensator transformer to the terminal D2 of secondary 16. As seen in FIG. 4, the signals from D3 and from D2 inverted combine to form a resultant R which is in the opposite phase to S1. The magnitudes of the resultant relative to that of S1 is given by twice the turns ratio for each partial winding times cos 30°, i.e. $2 \times (1/\sqrt{3}) \times \cos 30° = 1$. Thus vector R is equal and opposite to vector S1.

In this way the instantaneous phase components of the outputs of the delta-connected secondary 16 are effectively linked with the corresponding components of the outputs of the star-connected secondary 14, in such a manner as to tend to equalise the currents drawn through the two secondary windings. The relative polarities of the windings are such that if the current in the main winding 32 is low the flux conditions will add voltage to this circuit and subtract voltage from the circuit with the high current winding including the associated partial windings 34, 36 and vice versa. This will tend to correct the current balance.

It will be appreciated that the compensator transformer may be connected in various alternative ways. For example the main windings could be connected to the delta-connected secondary 16 and the partial windings to the star-connected secondary 14.

Conveniently the main transformer and compensator transformers can all be mounted in the same oil tank. This reduces the effects of the noise generated at six times the supply frequency, as compared with an arrangement such as that of FIG. 1 with the interphase transformer outside the oil tank.

The output voltage/current characteristic for the circuit of FIG. 3 is still similar to that shown in FIG. 5.

It will be appreciated that the arrangements described can be generalised for multiphase systems of higher order than three.

We claim:

1. A rectifier unit for producing unidirectional current from an n-phase a.c. supply, where n is equal to 3 or an integer greater than 3, the unit comprising:
   means for providing from the supply two n-phase sources which differ in phase by 1/4n cycles, or an odd integral multiple thereof;
   two n-phase bridge rectifiers having their inputs connected to receive the signals from the two sources and their outputs coupled together to provide the output of the unit; and
   compensating means coupled between the sources and the rectifiers for modifying the signals applied to the latter, the compensating means comprising n transformer sections each coupled to at least one output of one of the sources and at least two outputs of the other source, and being arranged such that any difference in the current drawn from one source, compared with the current with the same phase drawn from the other source, produces a compensating magnetic flux tending to equalize the current drawn from the two sources.

2. A rectifier unit according to claim 1, wherein the means for providing two n-phase sources comprises a transformer with two differently connected secondary windings.

3. A rectifier unit according to claim 2, wherein n equals three.

4. A rectifier unit according to claim 3, wherein one secondary winding is in star configuration and the other is in delta configuration.

5. A rectifier unit according to claim 1, wherein the n transformer sections are respectively constituted by n individual transformer units.

6. A rectifier unit according to claim 1, wherein the n transformer sections are respectively constituted by n limbs of a single transformer unit.

7. A rectifier unit according to claim 1, wherein each transformer section comprises three or more windings each connected to said outputs of said sources.

8. A rectifier unit according to claim 7, wherein each of the transformer sections comprises a main winding coupled to a respective phase of one of the sources and two subsidiary windings which is coupled to the other source to receive those phases therefrom which are closest to and on either side of the phase of the associated main winding.

9. A rectifier unit according to claim 8, wherein the two subsidiary windings of each section are opposed to each other and each subsidiary winding has $1/\sqrt{3}$ times as many turns as the main winding.

10. A rectifier unit according to claim 1, wherein any current difference causes a resultant magnetic flux in one or more of the transformer sections which tends to equalize the currents without additional current monitoring and control circuits.

* * * * *